United States Patent Office 3,508,881
Patented Apr. 28, 1970

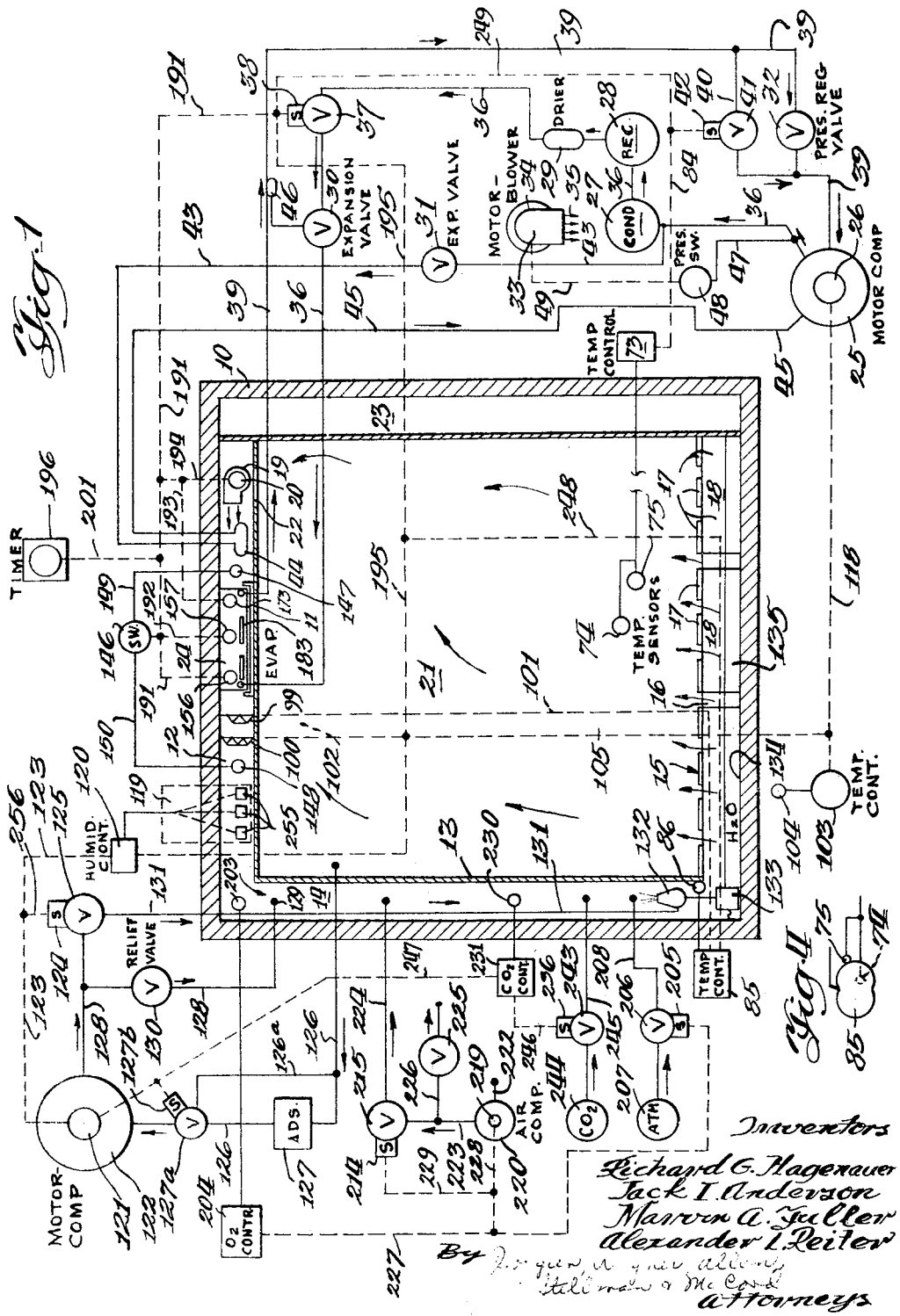

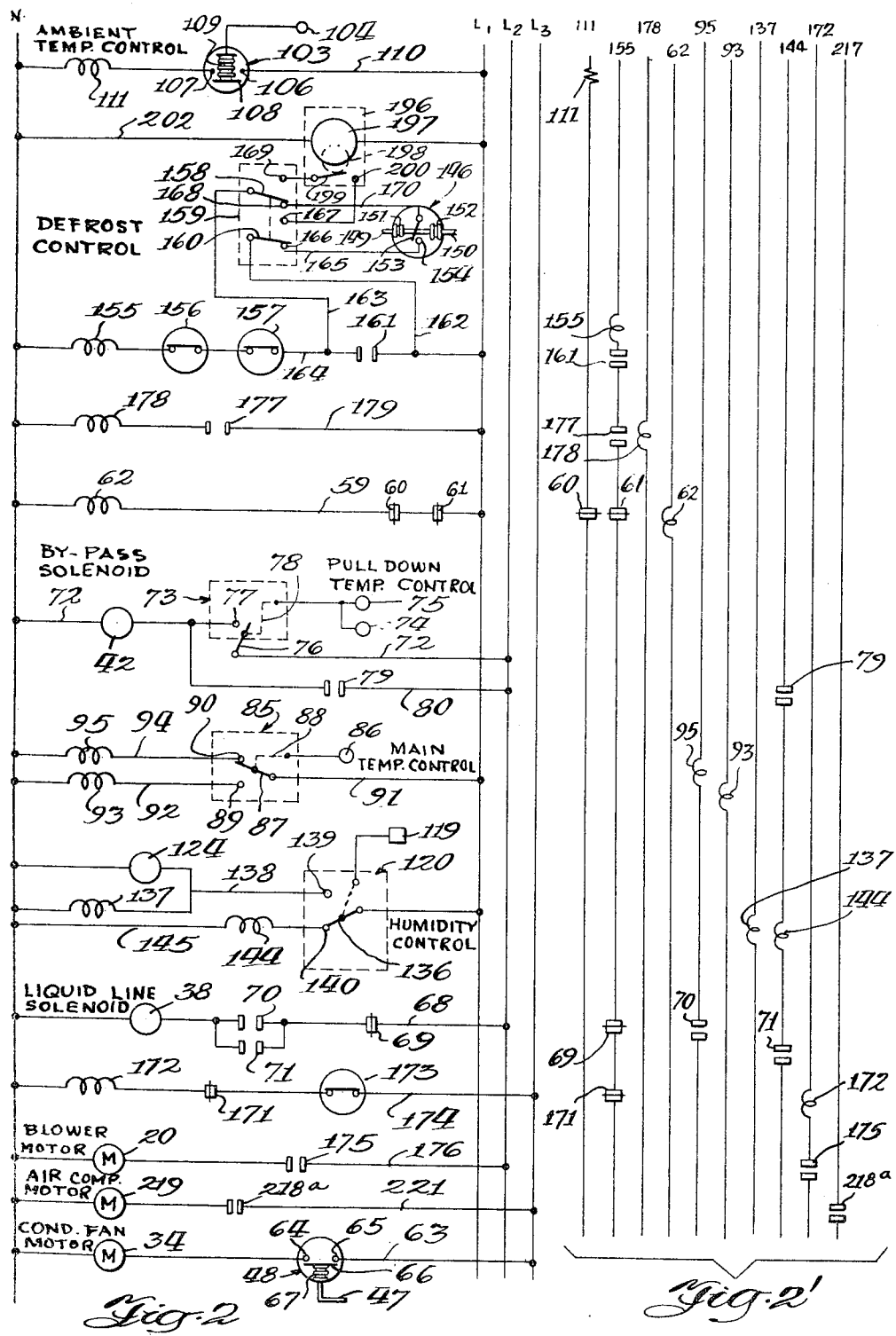

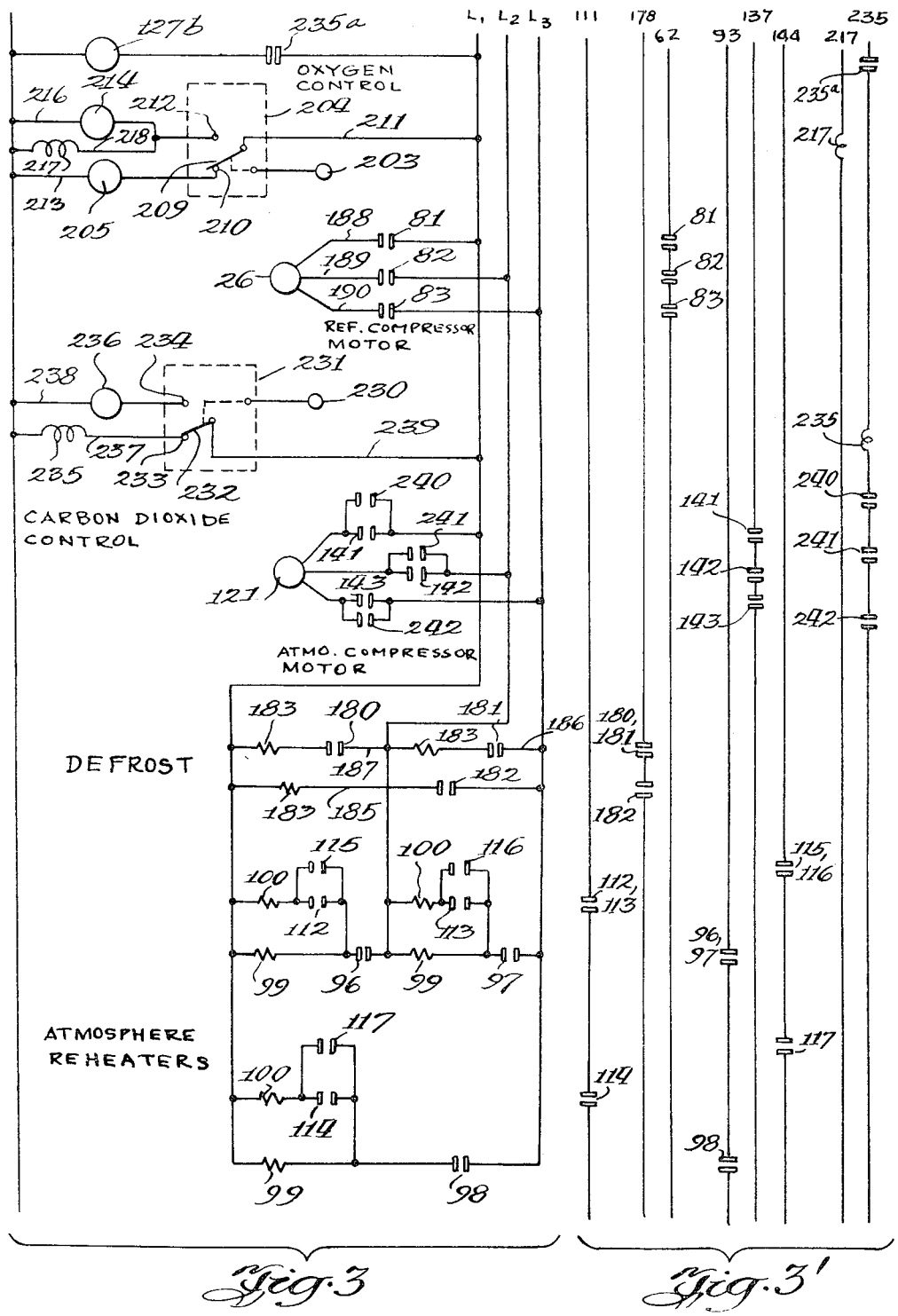

3,508,881
STORAGE UNIT
Richard G. Hagenauer, Southfield, Mich., Jack I. Anderson, Salinas, Calif., and Marvin A. Fuller, Benton Harbor, and Alexander L. Reiter, St. Joseph, Mich., assignors to Whirlpool Corporation, a corporation of Delaware
Original application Mar. 9, 1964, Ser. No. 350,205, now Patent No. 3,307,618, dated Mar. 7, 1967. Divided and this application Dec. 1, 1966, Ser. No. 598,255
Int. Cl. B01j 7/00; F26b 21/06; A23b 7/00
U.S. Cl. 23—281    2 Claims

ABSTRACT OF THE DISCLOSURE

Fluid circuitry and atmosphere control system for automatically maintaining preselected levels of oxygen, carbon dioxide, nitrogen and moisture in the atmosphere of a storage container for plant and animal materials.

---

This application is a division of our copending application Ser. No. 350,205, filed Mar. 9, 1964 which has matured in U.S. Patent No. 3,307,618, on Mar. 7, 1967.

This invention relates to a storage unit for storing perishable animal and plant materials and to controls therefor.

In Bedrosian et al. Patent 3,102,777 there is disclosed and claimed an apparatus and method of preserving animal and plant materials in which the materials are subjected to a storage atmosphere containing oxygen and carbon dioxide in controlled quantities and in which the materials may be maintained at a desired storage temperature depending upon the type of material being stored.

In the copending application of Fuller et al. Ser. No. 316,991, now Patent No. 3,183,683, filed Oct. 17, 1963, there is disclosed and claimed a container which may be fixed or portable in which the materials may be stored. Both this application and the above patent are assigned to the same assignee as is the present application.

The invention disclosed and claimed herein may be embodied in a container or storage unit as disclosed and claimed in the above Fuller et al. application.

As is explained in the above Bedrosian et al. Patent No. 3,102,777, the degradation of stored animal and plant materials can be expressed by the following approximate respiratory change equation:

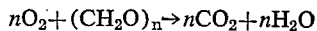

$$nO_2 + (CH_2O)_n \rightarrow nCO_2 + nH_2O$$

In this equation which expreses the chemical reactions involved, $(CH_2O)_n$ represents a carbohydrate molecule that is destroyed during the degration or deterioration process with $n$ being a whole number dependent upon the size of the molecule, with the size of the molecule, of course, depending upon the number of recurring $CH_2O$ units present. The practical lower limit of $n$ is, of course 6 and in this case the carbohydrate molecule would be that of a simple sugar. For more complex molecules $n$ could be extremely large such as 1,000,000 or more. However, in every instance one molecule of oxygen is consumed for each $CH_2O$ unit in the carbohydrate with the production of one molecule of carbon dioxide and one molecule of water. The carbohydrates are either present as such in the plant materials and microorganisms or may be produced as end products from other substances such as proteins and fats. In any event, the deterioration changes on storage of both animal and plant materials in the presence of oxygen such as the oxygen of normal air is expressed by the above chemical reaction equation.

The present invention provides apparatus for regulating and maintaining the amount of oxygen and carbon dioxide in the storage atmosphere so that the above equation can be materially slowed to increase the life of the stored materials. In addition, the apparatus of this invention permits control of the humidity and temperature conditions within the storage space.

One of the features of this invention is to provide an improved apparatus for storing for a period of time perishable animal and plant materials having improved means for controlling the environment within the container including the contents of the storage atmosphere, the humidity conditions and the temperature conditions, either individually or in combinations.

Other features and advantages of the invention will be apparent from the following description of one embodiment thereof taken in conjunction with the accompanying drawings. Of the drawings:

FIGURE 1 is a semi-schematic cross sectional elevational view of a storage container embodying the invention together with environmental controls therefor.

FIGURES 2 and 3 together constitute an across the line circuit diagram for the electrical portions of the apparatus.

FIGURES 2' and 3' together constitute a key diagram for the circuit of FIGURES 2 and 3.

FIGURE 4 is a schematic view illustrating two temperature sensors of a temperature control with one sensor inserted in a material being stored, here an apple, and the other sensor in contact with the surface thereof.

The container

The apparatus of this invention comprises a container 10 which is similar to the container disclosed in the above Fuller et al. patent and which contains circulating air passages at the sides, bottom and top similar to those disclosed in the Fuller et al. patent. Thus, the container has a false top 11 to provide an atmosphere passage 12, a false side wall 13 to provide a side atmosphere passage 14 and a false bottom 15 to provide a bottom atmosphere passage 16. The bottom 15 is made up of parallel spaced coplanar supports 17 supported on parallel spaced cross supports 18 to permit atmosphere flow upwardly between the supports 17 and 18.

The upper atmosphere passage 12 is provided with a series of blowers 19 operated by motors 20. These blowers receive atmosphere from the storage space 21 through openings shown schematically at 22. The blowers 19 circulate atmosphere through the container by drawing in the atmosphere as mentioned through the openings 22 from the space 21 and blowing it to the left, as shown in FIGURE 1, through the horizontal top passage 12. From here the atmosphere is forced downwardly through the side passage 14, into the bottom passage 16, upwardly between the horizontal spaced supports 17 and back into the space 21 to complete the circuit.

The passages 12, 14 and 16 and the blowers 19 and motors 20 in approximately one-half of the container 10 are as shown in FIGURE 1. Similar elements for the other half of the container are arranged directly opposite. This is illustrated more completely in the above-mentioned Fuller et al. patent. Thus, in the side passage 23 which is opposite to the side passage 14 flow of the atmosphere is downward as caused by the elements of the other half of the container.

Temperature controls

Located in the top atmosphere passage 12 downstream from the blowers 19 is a refrigerant evaporator 24. The refrigeration system also includes a refrigerant compressor 25 operated by an electric motor 26, a condenser 27, a refrigerant receiver 28, a dryer 29, an expansion valve 30, a second expansion valve 31, a pressure regulating valve 32 and a blower 33 operated by a motor 34 and arranged to cool the condenser 27 as indicated by the arrows 35.

The compressor 25 is arranged to operate substantially continuously under normal conditions as it has been found that this produces better temperature control in the storage space 21 and avoids heavy start-up loads as is true where the temperature is controlled by cycling the compressor on and off.

In order to provide for this substantially continuous operation of the compressor 25 two refrigerant circuits are provided with one being used to supply liquid refrigerant to the evaporator 24 when cooling is required and the other permitting circulation of the refrigerant from and to the compressor when refrigeration is not required.

One of these refrigerant flow circuits includes a line 36 for hot refrigerant gas from the compressor 25 to the condenser 27. From the condenser 27 the line 36 conveys hot refrigerant liquid from the condenser 27 to the receiver 28 and the dryer 29.

From the dryer 29 to line 36 connects to a valve 37 operated by a solenoid 38 and from there to the expansion valve 30. From the valve 30 the line 36 conveys the liquid refrigerant which is now a cool liquid because of its passage through the expansion valve to the inlet to the evaporator 24.

The expanded refrigerant gas is conducted from the evaporator 24 through a line 39 back to an inlet to the compressor 25 by way of the pressure regulating valve 32. This regulator valve 32 maintains a constant back pressure on the evaporator 24 to keep the evaporator operating at a substantially constant temperature.

An auxiliary line 40 is provided around the pressure regulating valve 32 with this line 40 containing a valve 41 operated by a solenoid 42.

As is obvious from the above, the lines 36 and 39 provide the refrigerant circuit through the evaporator 24 when cooling is required.

In order to provide for refrigerant flow when cooling is not required, so that the compressor 25 may be operated substantially continuously, there is provided a refrigerant gas line 43 leading from the line 36 upstream of the condenser 27. This line 43 directs refrigerant through expansion valve 31 to a coil 44 in the top atmosphere passage 12 in the container 10 downstream of the blowers 19 and between these blowers and the evaporator 24. The coil 44 is located in this position so that the refrigerant gas in line 43 will be cooled by the blowers.

From the coil 44 the refrigerant is returned to the compressor 25 by way of a line 45. Lines 39 and 45 are under the same pressure, in this case the suction pressure of compressor 25.

When valve 37 is opened by its solenoid 38 to provide refrigeration in the circulating atmosphere within the container 10 the refrigerant flows from the compressor 25 through line 36 by way of the condenser 27, receiver 28, dryer 29, open switch 37 and expansion valve 30 to the evaporator. The refrigerant is returned from the evaporator 24 through the line 39 to the compressor 25 by way of the pressure regulating valve 32.

When refrigeration is not required valve 37 will be closed so that now the refrigerant will flow from the compressor 25 through line 43, expansion valve 31, coil 44, line 46 back to the compressor. The expansion valve 30 is controlled or modulated by a conventional thermostat 46 on the refrigerant line 39 which is a suction line leading from the evaporator to the compressor.

Connected to the refrigerant outlet line 36 by way of a branch line 47 is an ordinary pressure operated switch 48. This switch 48 controls the operation of the blower motor 34, as indicated by the connecting dash line 49. Here as with the other dash lines of FIGURE 1 the element controlled and the controller therefor are connected by dash lines for clarity of illustration.

If the condenser 27 is not condensing substantially all of the gaseous refrigerant to a hot liquid, pressure will build up in the line 36. At a predetermined pressure, after start-up of compressor 25, such as about 130 pounds per square inch the pressure switch 48 will close the circuit to the motor 34 to operate the blower 33 and cool the condenser by the air stream 35. When operation of compressor 25 is discontinued, or as soon as the pressure in the line 36 drops to a pressure such as about 90 pounds per square inch, indicating that the refrigerant is being condensed to a liquid, switch 48 will open to stop operation of the blower 33.

Pressure switch 48 which as previously described controls the operation of the motor 34 of the blower 33 is in an electric line 63 which is across electric leads N and L$_3$ with the motor 34 and switch 48 being in series. As is shown at the bottom of FIGURE 2, the switch 48 comprises a pair of spaced contacts 64 and 65 and a movable bridging contact 66 adapted to close the circuit between contacts 64 and 65. The movable contact 66 is moved by pressure in the fluid line 47 operating through a bellows 67.

The solenoid 38 which as previously mentioned controls refrigerant flow through valve 37 to the evaporator 24 is in an electric line 68 connected across electric leads N and L$_2$. The solenoid 38 is in series with a normally closed switch 69 and in series with a pair of normally open switches 70 and 71 arranged in parallel with each other.

The solenoid 42 which controls the by-pass valve 41 which permits refrigerant flow from the evaporator 24 to the compressor 25 to by-pass the pressure regulator valve 32, as previously described, is in an electric line 72 that extends between the leads N and L$_2$. In the line 72 the solenoid 42 is in series with a temperature control switch 73 of a well known construction which is adjustable to actuate at a preselected temperature. The temperature control 73 is connected to a pair of temperature sensors 74 and 75 whose operation will be described hereinafter.

The temperature control 73 which is of usual construction includes a movable switch arm 76 that is moved into and out of engagement with a fixed contact 77 by temperature sensed by the sensors 74 and 75. This relationship is indicated by the dash line 78. Arranged in parallel with the control switch 73 is a normally open switch 79 in its electric lead 80 which has one end connected to the circuit line L$_2$ and the other end connected to the line 72 between the solenoid 42 and the switch 73.

As described earlier, when the evaporator 24 is operating normally to cool the space 21 in the container 10 the valve 41 is closed so that the refrigerant return line 39 from the evaporator is maintained at a constant pressure by the pressure regulating valve 32. When it is desired to operate the evaporator 24 at increased capacity so as to produce a lower temperature, solenoid 42 is used to open valve 41 so that the return refrigerant may flow without restriction into the compressor 25 by way of the bypass line 40. The circuit to the solenoid 42 is controlled by a number of controllers including the previously described temperature control 73 as is indicated by the dash line 84 of FIGURE 1.

Temperature control 73 is adjustable and is operated by the sensor 74 which is inserted in the material being stored in space 21 with the other sensor 75 contacting the surface of the article. FIGURE 4 exemplifies this arrangement in an apple 85. The material such as the apple 85 with which the sensors 74 and 75 are associated should preferably be located at the coldest place in the stored material. With this arrangement when the stored material interior temperature is above the temperature as set on the control 73, as when the warm harvested material is first placed in the container 10, sensor 74 activates switch 76 to engage contacts 77 and energize the solenoid 42. This opens the valve 41 to permit full flow of refrigerant into and from the compressor so that the evaporator 24 functions at a lower than normal temperature to chill rapidly the stored material. Since the stored product under these conditions may freeze from the outside in before the sensor 74 is activated to close valve 41, the surface sensor 75 operates to maintain a temperature in space 21 which is the lowest value at which the product surface will not freeze. Sensor 75 therefore controls the rapid chilling of the stored product until the temperature of the interior of the material being stored and the sensor 74 reaches the predetermined temperature as set on control 73, whereupon the switch 73 is opened to de-energize solenoid 42 and close the valve 41 whereupon the refrigeration system operates in its normal manner. This normal operation continues until a low chilling temperature is again required in the storage space 21.

During normal functioning of the apparatus of this invention to store materials as previously described, the preselected temperature within the space 21 is controlled by the temperature control 85 which has a sensor 86. The sensor 86 is preferably located at the coldest area within the container 10 and is illustrated in FIGURE 1 as at the junction of the side atmosphere passage 14 and the bottom passage 16.

As is shown in FIGURE 2 temperature control 85 contains a movable switch arm 87 which is moved by the temperature of the sensor 86, as indicated by the dash line 88. This temperature control switch 85 is a conventional commercially available product. The temperature sensed by the sensor 86 moves the switch arm to engage either one contact 89 or a second contact 90 or neither. The switch 87 is connected by an electric line 91 to the lead $L_1$. The contact 89 is connected by a line 92 to electric lead N and the line 92 contains a relay coil 93. The other switch contact 90 is similarly connected to N by a line 94 which also contains a relay coil 95. Relay coil 95 when energized closes the normally open switch 70 which is in series with solenoid 38 for energization thereof and relay coil 93 closes normally open switches 96, 97 and 98 to energize reheater 99.

As is shown in FIGURE 1 the top atmosphere passage 12 contains an electric reheater 99 and an electric reheater 100. Reheater 99 is controlled by the temperature control 85 as indicated by the dash line 101 and reheater 100 is controlled by temperature control 85 and an external temperature control 103 having a temperature sensor 104 as indicated by the dash lines 105 and 102.

As shown at the top of FIGURE 2 the temperature control 103 which is a standard readily available product comprises a pair of spaced fixed contacts 106 and 107 adapted to be engaged by a movable bridging contact 108 that is moved by a bellows 109 activated by the sensor 104. The switch 103 is in an electric line 110 across the leads N and $L_1$ and in series with a relay coil 111. The coil 111 is arranged to open the normally closed switch 60 and to close the normally open switches 112, 113 and 114. When switch 60 opens, relay coil 62 is de-energized opening switches 81, 82 and 83 and de-energizing compressor motor 26. As can be seen in FIGURE 3, switch 112 is in series with reheater 100 and with switch 96 with this series being connected across the lines $L_1$ and $L_2$. Reheater 99 is also in this circuit across $L_1$ and $L_2$ but is in parallel with reheater 100 and switch 112. Switch 113, reheater 100 and switch 97 are also in series across lines $L_2$ and $L_3$ with reheater 99 also being across these lines but in parallel with heater 100 and switch 113. Switch 114 and reheater 100 are in parallel with reheater 99, and all are in series with switch 98, with this circuit being across the lines $L_1$ and $L_3$. In addition, normally open switch 115 is in parallel with switch 112, normally open switch 116 is in parallel with switch 113 and normally open switch 117 is in parallel with switch 114.

As explained earlier, the sensor 86 of the temperature control 85 maintains the preselected temperature within the storage space 21. If sensor 86 senses a lower than preselected temperature on the control 85 within the space 21 the switch arm 87 is moved to engage contact 89 and energize relay coil 93. This energizing of relay coil 93 closes the normally open switches 96, 97 and 98 to energize the reheater 99 which will then provide heat to the circulating air stream in the manner previously described. When the storage space 21 is raised to the preselected temperature on the control 85 the sensor 86 moves switch arm 87 out of engagement with contact 89 to de-energize coil 93 which permits contacts 96, 97 and 98 to open and de-energize the reheater 99. When the sensor 86 senses a higher than preselected temperature on the control 85 it moves the switch arm 87 into engagement with contact 90 to energize coil 95 which closes switch 70 and energizes solenoid 38 of valve 37 to provide refrigerant flow to evaporator 24.

The principal temperature control 85 therefore operates to supply heat to the storage space 21 when the temperature therein is too low and supply cold when the temperature is too high. In the control 85 the contact 90 which controls the relay 95 provides and controls the cooling, and the contact 89 which controls the relay 93 provides and controls the heating.

As described earlier sensor 104 of temperature control 103 is located outside the container to sense the ambient temperature of the surrounding atmosphere. When the ambient temperature falls below the preselected temperature required in the storage space 21 the sensor 104 moves the bridging contact 108 into engagement with the contacts 106 and 107 to energize the relay coil 111. Coil 111 thereupon opens contact 60 to de-energize relay coil 62 which thereupon permits switches 81, 82 and 83 to the refrigerant compressor motor 26 to open and stop the compressor 25. This relationship of the temperature control 103 to the compressor motor is indicated by the dash line 118. The compressor is stopped during this period as refrigeration is no longer needed due to the low ambient temperature.

The energizing of relay coil 111 by the temperature control 103 also closes switches 112, 113 and 114 to place the heater 100 in the electrical circuit along with the reheater 99 so that both can be controlled by the switches 96, 97 and 98 which are controlled by the main temperature control 85 and its sensor 86 as described previously.

Humidity control

Located in the upper passage 12 for the circulating atmosphere is a sensor system 119 for a humidity control 120. Both the humidity control and its sensor are standard products that are readily available commercially. The sensor elements 255 of the sensor 119 are positioned downstream from the heaters 99 and 100 and the evaporator 24. The sensor 119 monitors the relative humidity of the atmosphere in the passage 12 and sends the signal to the humidity control 120 which may be adjusted to maintain any preselected relative humidity within its operating range.

The humidity control 120 is arranged to activate the motor 121 of an air compressor 122 as indicated by the dash line 123. The control 120 is also arranged to activate the solenoid 124 of a valve 125 as indicated by the dash lines 123 and 256. The air compressor 122 is arranged to draw atmosphere from the storage space 21 through a fluid line 126 or 126a, with the line 126 containing an adsorber 127 for adsorbing carbon dioxide and a two-way valve 127a for controlling the flow of atmosphere from storage space 21 through either of lines 126 or 126a. If the carbon dioxide level in space 21 rises above a predetermined amount, the carbon dioxide control 231 will activate valve 127a to cause atmosphere to flow through adsorber 127 to remove carbon dioxide therefrom. If the carbon dioxide level in space 21 reaches or drops below a predetermined amount, the carbon dioxide control 231 will de-activate valve 127a to allow atmosphere from space 21 to bypass adsorber 127 and flow through line 126. This adsorber contains finely divided activated carbon which is the adsorbing medium for removing carbon dioxide as described in Brown et al. copending application Ser. No. 213,520, filed July 30, 1962, now Patent No. 3,203,771, and assigned to the same assignee as the present application.

From the compressor 122 a fluid line 128 leads to an outlet 129 in the atmosphere passage 14. Also located in this line is a pressure relief valve 130 that is arranged to open at a predetermined pressure such as about 20 pounds per square inch. Connected to the fluid line 128 between the compressor 122 and the valve 130 is a fluid line 131 which exhausts through a liquid atomizer 132 having an inlet 133 located at the bottom 134 of the container 10. This bottom 134 is adapted to retain a body of water 135 which is initially placed there and is maintained either by added water or by defrost water from defrosting the evaporator 24. In any event, a sufficient level of water 135 is maintained so that the inlet 133 will draw in water for atomizing at 132 by compressed atmosphere flowing through the line 131.

If the humidity sensor 119 senses a relative humidity lower than that set on the control 120 the control energizes solenoid 124 of valve 125 and energizes motor 121 of compressor 122. The compressor thereupon draws atmosphere from the storage space 21 through the fluid line 126 and adsorber 127 or fluid line 126a dependent upon the level of carbon dioxide in space 21 as discussed above. In the compressor 122 the atmosphere is compressed and directed through line 131 and valve 125 into the atomizer 132. Here the atmosphere flow picks up water from the water body 135 and distributes it into the down flowing atmosphere stream in the side passage 14. This atomizing of the water into the atmosphere raises the humidity.

Humidity control 120 is provided with spaced fixed contacts 139 and 140 and a switch arm 136 that is movable by temperatures sensed by the sensor 119 as indicated on FIGURE 2. The contact 139 is connected by an electric line 138 on the solenoid 124 of valve 125 and relay coil 137. The solenoid 124 and relay 137 are in parallel with each other and the control 120 are connected across the circuit lines N and $L_1$. Contact 140 of humidity control 120 is connected to circuit line N by way of line 145. Thus with this arrangement solenoid 124 and relay coils 137 and 144 are connected to circuit line N while a movable contact arm 136 of the control is connected to the circuit line $L_1$.

When sensor 119 senses a low humidity condition the switch arm 136 is moved to engage contact 139 and energize solenoid 124 and relay coil 137. Relay coil 137 thereupon energizes switches 141, 142 and 143 (FIGURE 3) which energizes the compressor motor 121 to operate the compressor 122. At the same time solenoid 124 is energized to open valve 125 so that the compressor atmosphere will atomize water from the body 135 to raise the humidity as previously described. When the desired humidity is reached switch arm 136 is disengaged from contact 139, de-energizing relay coil 137 and solenoid 124 to discontinue humidification.

When the sensor 119 of the humidity control senses a high humidity that is greater than that set on the control 120, switch arm 136 is moved to engage contact 140. This energizes relay coil 144. Relay coil 144 closes switch 71 to energize solenoid 38 and open valve 37 for flow of refrigerant into the evaporator 24. Coil 144 also closes switches 115, 116 and 117 to place reheater 100 in the circuit with reheater 99. Coil 144 also closes switch 79 to energize solenoid 42 to open valve 41 so that returning refrigerant may flow freely into the refrigerant compressor 25. The opening of valves 37 and 41 therefore operates the evaporator at lower temperatures so that the excess moisture collects as frost on the evaporator 24. When sensor 86 of control 85 senses a drop in temperature of space 21, control 85 actuates to close switches 96, 97 and 98 to energize reheaters 99 and 100 which are downstream from the extremely cold evaporator 24 to reheat the air from the evaporator to maintain the predetermined storage temperature of the stored materials during the removal of the moisture in the form of frost. As an example, in one embodiment of the invention the evaporator is normally operated at about 30° F. During the extreme cooling of moisture removal the evaporator is operated at about 20° F.

When the humidity sensor of control 120 senses a correct humidity condition in the storage space 21, as represented by the circulating atmosphere in the upper passage 12, switch arm 136 of humidity control 120 disengages contact 140 to de-energize the relay coil 144. This de-energizes solenoid 38 to permit refrigerant supply valve 37 to close and de-energize solenoid 42 to permit bypass valve 41 to close so that the refrigeration apparatus now operates in the normal manner. At the same time the de-energizing of relay coil 144 opens switches 115, 116 and 117 which de-energizes the reheater 100. The other reheater 99 remains in the circuit and will not be de-energized until the sensor 86 of main temperature control 85 senses the preselected temperature in space 21 that is set on the control 85. The relationship of the humidity control 120 to solenoids 38 and 42 is indicated on FIGURE 1 by the dash lines 195 and 249.

Defrost control

During normal operation of the refrigeration system frost tends to build up on the evaporator 24. Frost also builds up, as previously described, in removing excess humidity. As the frost builds up on evaporator 24, flow of atmosphere forced therethrough by the blowers 19 is restricted. This increases the atmosphere pressure on the upstream side of the evaporator and decreases it on the downstream side. This difference in pressure is used to operate automatically the defrost system.

A differential pressure switch 146 is provided having a static pressure sensor 147 on the upstream side and a similar sensor 148 on the downstream side of the evaporator. These pressures are conveyed to the opposite sides of switch 146 by fluid pressure lines 149 and 150, and bellows 151 and 152, respectively.

Higher pressure in line 149 caused by increasing frost accumulation moves a movable switch arm 153 into engagement with a fixed contact 154 in the switch 146. This completes a circuit through a relay coil 155 (FIGURE 2), a high limit safety thermostat 156 on the evaporator which is arranged to open at about 75° F., a defrost termination thermostat 157 also in the evaporator and arranged to open at about 55° F., a selector switch arm 158 of a manually operated double pole double throw switch 159 and a selector switch arm 160 in this same switch. There is also provided a normally open switch 161. In order to provide the power supply for this arrangement an electric lead 162 extends between line $L_1$ and switch arm 160. Another electric lead 163 extends from the other switch arm 158 to a line 164. Coil 155 and switches 156 and 157 are in series in line 164. Normally open switch 161 is arranged across lines 162 and 163. The side of line 164 opposite its connection to line 163 is connected to the supply line N. To complete the circuit an electric line 165 extends from the fixed contact 154 to a terminal 166 on the switch 159. A second terminal 167, a third terminal 168 and a fourth terminal 169 are provided on the switch 159. When the jointly movable switch arms 158 and 160 are in the positions shown in FIGURE 2, they engage the contacts 166 and 168, respectively. When the switch arms are raised from the positions shown they engage terminals 167 and 169, respectively.

As stated above, increasing pressure caused by frost blockage of the evaporator moves switch arm 153 into engagement with switch contact 154 to energize the relay coil 155. This relay coil then closes normally open switch 161 which then acts as a holding switch to maintain electric power to the relay 155 and thus continues to energize it by bypassing switch 146. This is important as it keeps relay coil 155 energized even if switch 146 should open due to partial defrosting of the evaporator.

Energized relay coil 155 also opens normally closed switch 69 to make certain that solenoid 38 remains de-energized even if switches 70 and 71 were to be closed. This maintains valve 37 closed and blocks the refrigerant flow to the evaporator so that it cannot begin to cool during the defrosting operation.

The energized relay coil 155 also opens normally closed switch 171 to de-energize relay coil 172. This relay coil 172 is in series with a normally closed switch 171 and a normally closed thermostat 173 on the evaporator 24 with this series being in an electric line 174 across the supply lines $L_3$ and N.

The above described de-energizing of coil 172 by opening switch 171 permits normally open switch 175 (which has been closed during normal operation) to open. This switch 175 is in series with the motor 20 to the atmosphere circulating blowers 19 and connected across supply lines $L_2$ and N by an electric line 176. This de-energizing of blower motor 20 means that atmosphere is not circulated through the storage space during the defrosting, eliminating unnecessary temperature rise in space 21 from the preselected temperature.

The relay coil 155 energized as above described also closes normally open switch 177 to energize relay coil 178 which are in series with each other across supply lines $L_1$ and N and in electric line 179. This enerigizing of relay coil 178 closes normally open switches 180, 181 and 182 to energize the defrost heater 183 that is located on the evaporator, as shown in FIGURE 1. As is shown in FIGURE 3, switch 180 is in series in line 187 with the heater 183 across electric supply lines $L_1$ and $L_2$. Heater 183 is connected across these supply lines by another electric line 185. Switch 181 is in series with heater 183 in line 186 across supply lines $L_2$ and $L_3$. Switch 182 and heater 183 are in series in line 185 which places them across supply lines $L_1$ and $L_3$. This energizing of defrost heater 183 melts frost from the evaporator which then drops down in the form of water to replenish the body of water 135 at the bottom of the container 10.

The energized relay coil 155 also opens switch 61 in order to prevent energizing of the relay coil 62 during defrosting. This de-energizing of coil 62 maintains switches 81, 82 and 83 to the compressor motor 26 open so that the compressor 25 cannot operate during defrosting. As is shown at the top of FIGURE 3, switch 81 is in electric line 188 extending between supply line $L_1$ and the compressor motor. Switch 82 is similarly in line 189 extending between supply line $L_2$ and the compressor motor. Switch 83 is in line 190 connecting supply line $L_3$ and the compressor motor 26.

After the frost has been melted from the evaporator as described above the temperature on the evaporator rises to a point such as about 53° F. indicating that defrosting is complete. At this point the termination thermostat 157 on the evaporator opens to de-energize the relay coil 155 and permit the normally open switches 161 and 177 to open. Switch 161 opens the circuit 164 and permits the pressure operated switch 146 to take control through the electric lines 162 and 163. Because the frost has now been removed so that pressures on opposite sides of the evaporator 24 are normal fluid pressure in the bellows 152 acting against the fluid pressure in the bellows 151 moves the switch arm 153 away from its contact 154. This returns the control to its normal condition.

The de-energizing of coil 155 as described also opens switch 177 and thereby de-energizes coil 178. The de-energizing of coil 178 permits switches 180, 181 and 182 to open, thereby breaking the circuit to the defrost heater 183.

The de-energizing of coil 155 closes switches 61, 69 and 171. This closing of switch 61 energizes coil 62 which closes the normally open compressor switches 81, 82 and 83 to again start the operation of the compressor. The closing of switch 69 subjects solenoid 38 of refrigerant supply valve 37 to the control of switch 70 of the main temperature control 85 and the switch 71 which is controlled by the humidity control 120. Switches 70 and 71 as shown in FIGURE 2 are in parallel with each other and in series with solenoid 38 and switch 69 in the line 68.

Thermostat 173 located on the evaporator 24 is in series with normally closed switch 171 and relay coil 172 in line 174. Because of the initial high temperature of the evaporator during and immediately following defrosting switch 173 is open to de-energize relay coil 172. This condition is maintained until the evaporator is chilled by the refrigerant to a predetermined low temperature such as about 38° F. When this occurs switch 173 closes to again energize relay coil 172. As soon as relay coil 172 is thusly energized it closes the normally open switch 175 in the line 176 to energize the motors 20 which operate the atmosphere circulating blowers 19 in order to begin circulation of the atmosphere through the storage space 21 as previously described. This delay prevents the blowers 19 from operating until the evaporator is at the preselected desired low temperature. Therefore, heat from the defrost heater 183 is not circulated into the storage space 21 where it would warm the stored material therein.

Instead of an automatic defrosting system as described a timer operated system can be used if desired. As is shown at the top of FIGURE 2 the timer 196 uses a motor 197 connected across supply lines N and $L_1$ by an electric line 202. The motor 197 operates a cam 198 which moves a contact arm 199 into engagement with a fixed contact 200 on the timer. Before this occurs the switch arms 156 and 160 of manually operated switch 159 have been moved into engagement with switch contacts 169 and 167 as described earlier. This results in the defrosting being controlled by the timer 196 and not by the atmosphere pressures on opposite sides of the evaporator 24 as described earlier.

Oxygen control

The amount of oxygen within the container 10 is controlled by an oxygen controller 204 having a sensor 203, illustrated in FIGURE 1, at the junction of the top passage 12 and side passage 14 of the atmosphere circuit within the container 10. Oxygen sensor 203 is a conventional device such as Beckman Model 764, which senses the oxygen level in the container 10 and actuates the control 204. This also is a conventional control such as Minneapolis-Honeywell Model R7161.

Oxygen control 204 as shown at the top of FIGURE 3 is arranged to energize a solenoid 205 of valve 206 when the oxygen level in the container is higher than that set on the control 204. This opening of valve 206 permits storage atmosphere which is normally low in oxygen, as explained in the above-mentioned Bedrosian et al. patent, to flow from a high pressure container 207 through a supply line 208 into the side atmosphere passage 14 for mingling with the atmosphere that is circulated therethrough. This supplying of atmosphere dilutes the oxygen in the container 10.

The oxygen control 204 includes a movable switch arm 209 that is moved in engagement with fixed contact 210 when the oxygen level is thus higher than that set on the control 204. The circuit to the solenoid 205 is then completed between supply lines $L_1$ and N by an electric line 211 to the switch arm 209 and a line 213 to the fixed contact 210, in which the solenoid 205 is located.

The oxygen control 204 has a second fixed contact 212. A solenoid 214 which controls valve 215 is in line 216, one end of which is connected to contact 212 and the other end to supply line N. In parallel with the solenoid 214, in line 216, is a relay coil 217 in electric line 218 also extending between the contact 212 and the supply line N.

If the oxygen level becomes too low in the container 10 the sensor 203 of the control 204 causes movable switch arm 209 to move away from contact 210 and engage contact 212. This energizes the solenoid 214 to open valve 215 and also energizes relay coil 217. The energizing of coil 217 closes the normally open switch 218a which is in series with motor 219 to an air compressor 220 in an electric line 221 which extends between supply lines N and $L_3$. This energizing of compressor motor 219 of the air compressor 220 causes the air compressor to draw air in through an air line 222 and exhaust it into the container 10 by way of a fluid line 223, the open valve 215 and a fluid line 224, all as shown in FIGURE 1. As a safety feature there is provided a pressure relief valve 225 set to open at a predetermined pressure such as about five pounds per square inch to permit the compressed air to escape through air line 226 in which the relief valve 225 is located.

When the sensor 203 of the oxygen control 204 senses a correct oxygen level in the storage space 21, as preselected on the oxygen control 204, the sensor 203 moves the switch arm 209 to a neutral position out of engagement with electric contacts 210 or 212. This de-energizes solenoids 205 and 214 as well as relay coil 217 which permits switch 218 to open and stop the operation of the motor 219 which drives the air compressor 220.

The relationship of the oxygen control 204 to the solenoid 205 is indicated by the dash line 227 of FIGURE 1. The relationship of this oxygen control to the air compressor motor 219 is indicated by the dash lines 227 and 228. The relationship of the oxygen control to the solenoid 214 is indicated by the dash lines 227, 228 and 229.

The carbon dioxide control

The carbon dioxide as well as the oxygen in the storage space 21 of the container 10 can vary from the preselected amounts. The carbon dioxide content is sensed by a sensor 230 of a carbon dioxide control 231 with the sensor 230 being located in the side passage 14 through which the atmosphere is passed during the circulation of the atmosphere within the space 21. The sensor 230 is a conventional device of which one example is a Model 200 infrared analyzer made by Mine Safety Appliances Co. This sensor monitors the carbon dioxide level in the container 10. The control 231 which is activated by the sensor 230 is also a conventional device of which one example is a Minneapolis-Honeywell Versatran controller.

As is shown in FIGURE 3 the carbon dioxide controller 231 includes a movable switch arm 232 which is moved by signals from the sensor 230. The arm 232 is moved by sensor 230 between spaced fixed contacts 233 and 234 of the control 231. The contact 233 is connected to a relay coil 235 and from there to electric supply line N by way of electric line 237. Fixed contact 234 is connected to a solenoid 236 and then to line N by an electric line 238. To complete the circuit the movable switch arm 232 is connected by line 239 to electric inlet line $L_1$.

The relay coil 235 when energized closes normally open switches 240, 241 and 242 to energize the motor 121 of the previously mentioned motor driven fluid compressor 122. Solenoid 236 when energized opens valve 243 which permits carbon dioxide from a high pressure container 244 to flow through a fluid line 245 into the side passage 14 of the container 10 to add this carbon dioxide to the atmosphere within the storage space 21.

When the sensor 230 senses a carbon dioxide content in the space 21 that is higher than that set on the control 231 the sensor moves the switch arm 232 into engagement with contact 233 as shown in FIGURE 3. This energizes relay coil 235 and closes the normally open contacts 240, 241 and 242 to energize the motor 121 to the compressor 122. The energization of relay coil 235 also closes contacts 235a which energizes solenoid 127b which in turn actuates valve 127a. The compressor then operates to draw atmosphere from the space 21 through the line 126, carbon dioxide adsorber 137 and valve 127a into the compressor 122. The atmosphere passing through the adsorber is reduced in carbon dioxide content in the manner previously described. The atmosphere is then returned by the compressor 122 through line 128 and pressure relief valve 130 to the side atmosphere passage 14 for return to the storage space 21.

When the carbon dioxide content in the storage space 21 has been reduced to the level preselected on the controller 231 the sensor 230 moves the switch arm 232 out of engagement with the fixed contact 233 to de-energize the relay 205, permit the switches 240, 241 and 242 to open and thereby de-energize the motor 121 to the compressor 122.

When the sensor 230 senses a lower level of carbon dioxide in the space 21 than that set on the controller 231, the switch arm 232 is moved into engagement with contact 234 to energize the solenoid 236. This opens the valve 243 and permits carbon dioxide to flow from the high pressure container 244 through the line 245 into the side passage 14 for flow into the storage space 21. As soon as the sensor 230 senses the preselected level of carbon dioxide in the storage space, the sensor moves the switch arm 232 out of engagement with the contact 234 to de-energize the solenoid 236 and permit the valve 243 to close.

As indicated earlier, the electrical associations of the various units of this apparatus are indicated by broken lines. Thus, line 191 indicates the relationship of the safety thermostat 156 and the solenoid 38 for the valve 37. Line 192 indicates the relationship between the defrost termination switch 157 and the differential pressure switch 146. Broken line 193 indicates the association of thermostat 173 and the above line 191. Broken line 194 indicates the association of the blower motor 20 and the above line 191.

In a similar manner, broken line 201 indicates the association of timer 196 and line 191. Broken line 246 shows the relationship between the carbon dioxide control 231 and the solenoid 236 of carbon dioxide valve 243. Broken line 247 shows the relationship between the motor 121 of the compressor 122 and the carbon dioxide control 231. Broken line 248 indicates the relationship between temperature control 85 and broken line 195 which extends between the humidity control 120 and the solenoid 38 to valve 37.

Operation

The operation of the individual components and circuit has already been described. A summary of the operation of the complete apparatus is as follows:

During normal operation of the apparatus of this invention the motor driven blowers 19 circulate atmosphere in a counterclockwise direction, as viewed in FIGURE 1, through the top passage 12, side passage 14, bottom passage 16, upwardly through the storage space 21 and back to the blowers 19. The other half of the container provides atmosphere circulation in the opposite direction.

The circulating atmosphere stream is chilled by flow through the evaporator 24 in the upper passage 12. The temperature within the container 21 is controlled to a temperature preselected on the main temperature controller 85 as sensed by its sensor 86. When cooling is required the sensor as indicated by the dash line 238 joined to dash line 195 opens solenoid valve 37 to permit liquid refrigerant to flow from the refrigerant compressor 25 by way of the condenser 27, receiver 28, dryer 29 and expansion valve 30 into the evaporator. Refrigerant is returned from the evaporator by way of line 39 and pressure regulating valve 32 to complete this circuit.

For efficiency of operation and to reduce the load of start-up on the compressor a separate refrigerant path is provided when the valve 37 is closed during periods when no cooling is required. In this second path refrigerant flows from the compressor 25 through a line 43 and a coil 44 and back to the compressor through a line 45. The coil 44 is located in the air stream from the blowers 19 so as to cool the refrigerant and return it as a cool gas to the compressor.

The main temperature control for the storage space 21 is provided by the control 85. However, the temperature within the space 21 can also be controlled by the stored material itself which is especially important for fast chilling of warm newly stored products. As exemplified in FIGURE 4 this is achieved by employing two temperature sensors 74 and 75, one of which is inserted into the material, such as an apple 85, and the other of which is located on the outer surface of the material. These sensors 74 and 75 operate through a temperature control 73 which provides fast chilling. When the temperature of the stored material is above that set on the control 73 the control operates solenoid valve 37, as indicated by the dash line 249, to permit flow of liquid refrigerant to the evaporator 24. At the same time control 73 opens solenoid valve 41, as indicated by the dash line 84, to permit free flow of refrigerant from the evaporator 24 into the compressor 25, thereby bypassing pressure regulating valve 32. This provides increased flow of liquid refrigerant to the evaporator 24 so that it operates at a subnormal temperature for rapid chilling. The positioning of the temperature sensor 75 on the outer surface of the apple 85 or other material regulates the temperature control 73 to prevent freezing of the material from the outside in. As soon as the temperature reaching the inserted sensor 74 is the same as that set on the control 73, control 73 de-energizes solenoids 38 and 42 and returns the temperature control to the main temperature controller 85.

In addition the external ambient air temperature must be taken into consideration as when it is lower than the temperature within space 21 it will affect the temperature within the storage space 21. This is achieved by providing external temperature control 103 which is activated by its sensor 105.

When the external temperature becomes abnormally low as preselected on the control 103, the control 103 de-energizes the compressor motor 26 to stop the compressor (one of the few times the compressor is stopped) and closes switches 112, 113 and 114 to place reheater 100 in the electrical circuit along with reheater 99 so that temperature control 85 can maintain the desired temperature of the atmosphere in the storage space 21. As soon as the external temperature rises above the temperature set on the control 103 (temperature set on control 103 is the same as set on control 85) the compressor motor 26 is re-energized and switches 112, 113 and 114 are opened, de-energizing reheater 100.

The apparatus of this invention also provides means for automatically maintaining a preset humidity in the atmosphere. When the humidity exceeds that preselected on the adjustable humidity controller 120 as sensed by the sensor 119, the evaporator 24 is operated at increased capacity as previously described by opening the refrigerant supply solenoid valve 37 and opening the bypass solenoid valve 41 to permit free flow of refrigerant into the compressor 25 and thus into the evaporator 24. The excess moisture is then deposited as frost on the evaporator 24. The temperature in space 21 is maintained during humidification by activating reheaters 99 and 100 and controlling the output of these reheaters by control 85.

As soon as the humidity in the space 21 reaches the pre-set value the humidity control 120 de-energizes solenoids 38 and 42 to return the system to normal operation.

When the humidity sensed by the sensors 119 is less than that preselceted, the control 120 activates compressor 122 to draw atmosphere from the space 21 by way of fluid line 126a and valve 127a to compress it and re-inject it by way of line 131 through the atomizer nozzle 132. The atomizer nozzle, operating on the Venturi principle, sucks up water from the body of water 135 on the bottom of the container 10 and projects it into the circulating atmosphere stream. In order to achieve this, of course, the humidity control 120 has also energized the solenoid 124 to open the valve 125 which provides access to the compressed atmosphere line 131. The atmosphere flows through this line rather than line 128 because of the pressure relief valve 130 located in line 128.

The evaporator 24 may be defrosted either automatically or by timer 196. When the automatic defrost is used the pressure drop of atmosphere forced through the evaporator 24 by the blowers 19 is used to activate the switch 146. This switch de-energizes solenoid 38 to close refrigerant supply valves 37 and prevent refrigerant flow to the evaporator. It also de-energizes blower motors 20 to stop the blowers. At the same time it energizes the defrost heaters 183 on the evaporator to melt the frost and permit the resulting water to flow down into the body 135 of water at the bottom of the container 10. As soon as the defrosting is terminated the heater 183 is de-energized and the motors 20 of the blowers are energized and the refrigeration system is returned to normal operation.

Instead of automatic defrosting as described which is controlled by frost build-up on the evaporator the defrosting may be accomplished in the customary manner by a timer 196. With the timer the evaporator is defrosted periodically at fixed intervals.

As stated earlier, the storage space 21 is maintained under preselected constant oxygen and carbon dioxide contents. The oxygen content is controlled by an oxygen controller 204. This controller is activated by the oxygen sensor 203 which is inside the container 10.

When the amount of oxygen in the container 10 is in excess of that preset on the controller 204 this controller energizes solenoid 205 to open valve 206 and permit oxygen poor atmosphere to flow from high pressure container 27 into the storage container 10.

When the sensor 203 senses an insufficient amount of oxygen in the storage atmosphere the controller 204 activates the motor 219 of the air compressor 220 to provide compressed air to the storage container 10.

The carbon dioxide content in the storage atmosphere is sensed by the sensor 230 which governs the operation of the carbon dioxide control 231. When there is insufficient carbon dioxide in the atmosphere, control 231 opens solenoid valve 243 to permit carbon dioxide to flow from the high pressure container 244 into the storage container 10. When there is excess carbon dioxide in the storage atmosphere, the control 231 energizes the compressor motor 121 to operate the compressor 122. This compressor draws storage atmosphere by way of fluid line 126 through the carbon dioxide adsorber 127 where carbon dioxide is removed. The compressed carbon dioxide poor atmosphere is then returned to the storage container by way of the line 128 and the pressure relief valve 130.

When the oxygen and carbon dioxide contents are those set on the controllers each controller is de-activated.

The apparatus of this invention provides means for adjusting the oxygen and carbon dioxide levels to maintain pre-selected conditions. The oxygen level sometimes gets too high because when the container is first loaded air of course enters and normal air contains about 21% oxygen. The oxygen level sometimes gets too low because oxygen is consumed by the stored materials as explained by the above respiratory change equation. Similarly, carbon dioxide sometimes gets too concentrated in the storage space because carbon dioxide is given off by the materials during the storage time. Carbon dioxide also occasionally gets too low, such as when the container is opened either for loading fresh material or removing a portion of the stored material as this permits the entry of air which normally contains only about 0.03% carbon dioxide.

Although the illustrative embodiment shows refrigeration, the stored materials may be maintained at a temperature that is either ambient or below or above ambient depending on many factors such as the length of the storage time, the type and source of materials being stored and the nature of the material itself. A practical but not excluding limit of temperature is about 29–120° F. Maintenance of the storage temperature may, in certain instances, require heating means as shown in order to maintain even the minimum temperature if the surrounding ambient temperature should be too low. For storing plant and animal materials such as fresh foods, a storage temperature of about 29–55° F. is preferred.

The preferred amount of oxygen in the storage atmosphere is maintained between approximately 1% and 10% by volume of the atmosphere and the amount of carbon dioxide is maintained from approximately 0.5 to 6 times the amount by volume of the oxygen with the remainder of the atmosphere being a gas such as nitrogen from the air supply that is inert to the stored materials and which therefore has no measurable chemical effect on the materials. In most instances, the amount of carbon dioxide is preferably between about 1% and 15% by volume when the amount of oxygen is between about 1% and 10% by volume. For example, an atmosphere that has been found to be effective for most storage under the conditions of this invention is one containing 4% oxygen, 10% carbon dioxide and 86% nitrogen. Some materials such as certain fruits may be better stored in an atmosphere containing 3% oxygen, 2% carbon dioxide and 95% inert gases, while other fruits may require for best results a storage atmosphere of 1% oxygen, 5% carbon dioxide and 94% inert gases. Of course, it is most important that the atmosphere, regardless of its actual gas content, is vented from the storage space during the time the preserving atmosphere is being supplied, so that the incoming atmosphere substantially continually replenishes the atmosphere within the space so that the atmosphere is not static.

The continual replenishing of the atmosphere within the storage space is necessary in order to remove respiration products as well as other products of aging. It has been discovered that if these products resulting from the storage in the atmosphere of this invention are not removed damage to the stored materials frequently occurs. Furthermore, by subjecting the stored materials to optimum conditions which includes the continual replenishing of the storage atmosphere, the appearance and quality of the stored materials may be maintained at desirable levels throughout the storage period. This continual replenishing may be achieved by venting the atmoshpere from the storage chamber as fresh atmosphere is introduced.

Although no means are shown for venting storage atmosphere from the container, venting can occur from the usual leakages around sealing gaskets and through screw holes, bolt holes and other normal sources. This is explained in the above-mentioned Bedrosian et al. patent.

Most animal and plant materials will be stored at 85–100% relative humidity. With some materials such as onions, grains and nuts the humidity may be lower such as that of ambient conditions. Thus, the relative humidity may be as low as 25% or lower and as high as 100%.

Examples of animal and plant materials that may be stored for long periods of time under the conditions of this invention are non-food materials such as cut flowers, tobacco, flower bulbs and the like and foods such as apples, berries, peaches, pears, milk products including milk, butter and cheese, onions, celery, tomatoes, carrots, oranges, meat and meat products, eggs, potatoes, bananas, grapes, asparagus, beans, grains, nuts, peas and the like.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for storing for a storage period perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: means forming an enclosure having a storage space for said materials; means for maintaining in said storage space during said period a storage atmosphere containing oxygen and carbon dioxide, the amount of oxygen being less than said normal air quantity and the amount of carbon dioxide being greater than said normal air quantity, to retard but not prevent the progress of said equation; means for withdrawing from said storage space and then returning to said storage space a portion of said storage atmosphere by way of an atmosphere conduit leading from said storage space and returning to said storage space; means for selectively directing said portion from said conduit through an auxiliary conduit to said storage space; means for utilizing said portion in said auxiliary conduit for introducing an added ingredient to said storage space; means including a fluid compressor in said atmosphere conduit for said withdrawing from said storage space and then returning to said storage space said portion of said storage atmosphere; carbon dioxide sorption means in said atmosphere conduit for removing carbon dioxide; a source of water; means forming an exit from said auxiliary conduit to said storage space; an injection nozzle at said exit having an inlet in said water source for injecting moisture into said storage space with compressed storage atmosphere from said auxiliary conduit; and means for selectively diverting said portion through said auxiliary conduit to introduce moisture to said storage space.

2. The apparatus of claim 1 wherein said means for selectively diverting comprises valve means, and there are provided carbon dioxide detection means in communication with said storage space for detecting the amount of carbon dioxide therein, means activated by said detection means when the carbon dioxide in said space exceeds a preselected concentration for operating said fluid compressor to withdraw said portion through said conduit and said sorption means and return said portion with its reduced carbon dioxide content to said storage space, means for terminating said fluid compressor means operation when the carbon dioxide in said storage space is at a preselected concentration, humidity detection means in communication with said space, moisture supply means operated by said humidity detection means when humidity in said space drops to a preselected level for simultaneously operating said fluid compressor to withdraw said portion through said conduit and opening said valve to direct said storage atmosphere portion through said auxiliary conduit to introduce moisture to said storage space, and means for terminating operation of said moisture supply means when humidity in said storage space reaches a second preselected level.

References Cited

UNITED STATES PATENTS

| | | | |
|---|---|---|---|
| 2,214,264 | 9/1940 | White | 99—271 |
| 2,353,538 | 7/1944 | Barber. | |
| 2,923,629 | 2/1960 | Bonomi. | |
| 3,107,171 | 10/1963 | Robinson | 99—154 |
| 3,313,630 | 4/1967 | Harvey | 99—150 |

JAMES H. TAYMAN, Jr., Primary Examiner

U.S. Cl. X.R.

21—74, 58; 34—46, 50; 99—150, 154, 189, 271